United States Patent
Bartz et al.

(10) Patent No.: US 7,814,086 B2
(45) Date of Patent: Oct. 12, 2010

(54) SYSTEM AND METHOD FOR DETERMINING SEMANTICALLY RELATED TERMS BASED ON SEQUENCES OF SEARCH QUERIES

(75) Inventors: Kevin Bartz, Cambridge, MA (US); Vijay Murthi, Glendale, CA (US); Benjamin Rey, Santa Monica, CA (US); Shaji Sebastian, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 445 days.

(21) Appl. No.: 11/600,698

(22) Filed: Nov. 16, 2006

(65) Prior Publication Data

US 2008/0120072 A1    May 22, 2008

(51) Int. Cl.
*G06F 17/30* (2006.01)
(52) U.S. Cl. .................. 707/708; 706/44; 706/45
(58) Field of Classification Search .............. None
See application file for complete search history.

(56) References Cited

U.S. PATENT DOCUMENTS

| | | | |
|---|---|---|---|
| 5,920,859 A | 7/1999 | Li | |
| 6,216,123 B1 | 4/2001 | Robertson et al. | |
| 6,347,313 B1 | 2/2002 | Ma et al. | |
| 6,578,022 B1 | 6/2003 | Foulger | |
| 6,675,159 B1 | 1/2004 | Lin et al. | |
| 6,941,293 B1 * | 9/2005 | Dean et al. | 707/3 |
| 6,981,040 B1 | 12/2005 | Konig et al. | |
| 2003/0055816 A1 | 3/2003 | Paine | |
| 2003/0069877 A1 | 4/2003 | Grefenstette | |
| 2004/0236667 A1 * | 11/2004 | Cotton | 705/37 |
| 2005/0015366 A1 | 1/2005 | Carrasco | |
| 2005/0060311 A1 * | 3/2005 | Tong et al. | 707/7 |
| 2006/0010105 A1 | 1/2006 | Sarukkai et al. | |
| 2006/0064411 A1 | 3/2006 | Gross | |
| 2006/0248068 A1 * | 11/2006 | Chien et al. | 707/4 |
| 2007/0260515 A1 * | 11/2007 | Schoen et al. | 705/14 |
| 2008/0077570 A1 | 3/2008 | Tang | |

OTHER PUBLICATIONS

U.S. Appl. No. 11/600,603, filed Nov. 15, 2006.
Hang Cui et al.; *"Probabilistic Query Expansion Using Query Logs"*; WWW 2002, May 7-11, 2002; Honolulu, Hawaii, USA; ACM 1-58113-449-5/02/ 0005; 9 pages.

(Continued)

*Primary Examiner*—Etienne P LeRoux
*Assistant Examiner*—Anteneh Girma
(74) *Attorney, Agent, or Firm*—Brinks Hofer Gilson & Lione (57) ABSTRACT

The present disclosure is directed to systems and methods for determining semantically related terms based on sequences of search queries. Generally, a semantically related term tool examines search logs to associate search queries with a user submitting the search query. The semantically related term tool establishes a plurality of sequences of search queries, each sequence of search queries comprising one or more search queries associated with a common user and relating to a common concept. The semantically related term tool receives one or more seed terms and determines one or more terms related to the received seed terms based on the established plurality of sequences of search queries.

14 Claims, 4 Drawing Sheets

OTHER PUBLICATIONS

Brian D. Davison et al.; *"Finding Relevant Website Queries"*; Department of Computer Sciences & Engineering, Lehigh University; WWW2003, May 20-24, 2003, Budapest, Hungary; 2 pages.

Deborah Fallows, PhD; PEW/Internet, PEW Internet & American Life Project; Search Engine Users, *Internet searchers are confident, satisfied and trusting-but they are also unaware and naïve.*; Embargoed for publication until 4pm, Jan. 23, 2005.

Trevor Hastie, et al., *"The Elements of Statistical Learning"*, Data Mining, Inference, and Prediction, Springer Series in Statistics. Springer-Verlag, New York, 2001.

*"Automatic Information Retrieval"*, Sep. 1980 IEEE, pp. 41-56.

Ning Liu, *"Learning Similarity Measures in Non-orthogonal Space"*, Department of Mathematical Science, Tsinghua University, Beijing China, Nov. 8-13, 2004, pp. 334-341.

\* cited by examiner

SYSTEM AND METHOD FOR DETERMINING SEMANTICALLY RELATED TERMS BASED ON SEQUENCES OF SEARCH QUERIES

BACKGROUND

When advertising using an online advertisement service provider such as Yahoo! Search Marketing™, or performing a search using an internet search engine such as Yahoo!™, users often wish to determine semantically related words. Two words or phrases are semantically related if the words or phrases are related in meaning in a language or in logic. Obtaining semantically related words or phrases allow advertisers to broaden or focus their online advertisements to relevant potential customers and allows searchers to broaden or focus their Internet searches in order to obtain more relevant search results.

U.S. patent application Ser. No. 10/020,712, filed Dec. 11, 2001, discloses recommendation of search terms to a user using collaborative filtering and web spidering. Various other methods and systems for determining semantically related terms are disclosed in U.S. patent application Ser. Nos. 11/432,266 and 11/432,585, filed May 11, 2006, assigned to Yahoo! Inc. For example, in some implementations in accordance with U.S. patent Ser. Nos. 11/432,266 and 11/432,585, a system determines semantically related terms based on web pages that advertisers have associated with various terms during interaction with an advertisement campaign management system of an online advertisement service provider. In other implementations in accordance with U.S. patent Ser. Nos. 11/432,266 and 11/432,585, a system determines semantically related terms based on terms received at a search engine and a number of times one or more searchers clicked on particular universal resource locators ("URLs") after searching for the received terms.

It would be desirable to develop additional systems and methods for determining semantically related terms based other sources of data.

DETAILED DESCRIPTION OF THE DRAWINGS

The present disclosure is directed to systems and methods for determining semantically related terms based on sequences of search queries. A sequence of search queries is a series of search queries received from a user in a given period of time relating to a common concept.

An online advertisement service provider may desire to determine semantically related terms to suggest to online advertisers so that the advertisers can better focus or expand delivery of advertisements to potential customers. Similarly, a search engine may desire to determine semantically related terms to assist a searcher performing research at the search engine. Providing a searcher with semantically related terms allows the searcher to broaden or focus any future searches so that search engines provide more relevant search results to the searcher.

Figure 1:
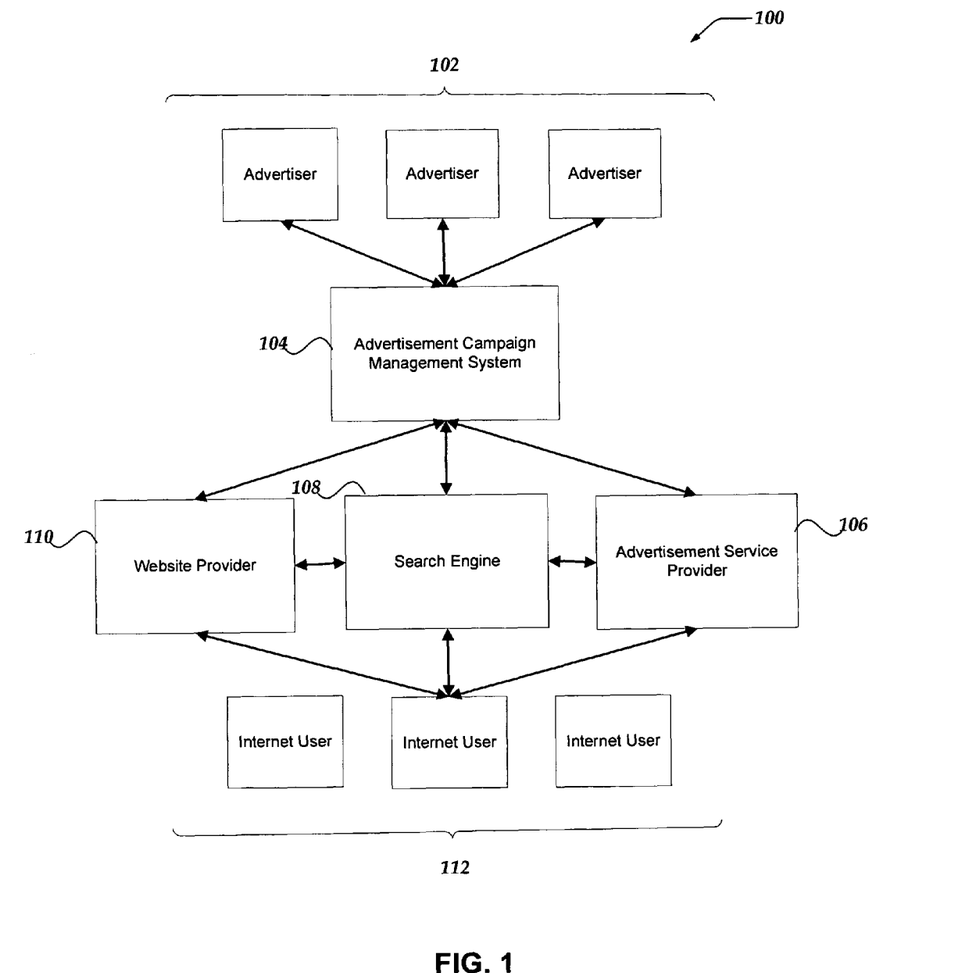
FIG. 1 is a block diagram of one embodiment of an environment in which a system for determining semantically related terms based on sequences of search queries may operate.

FIG. 1 is a block diagram of one embodiment of an environment in which a system for determining semantically related terms based on sequences of search queries may operate. The environment 100 includes a plurality of advertisers 102, an advertisement campaign management system 104, an advertisement service provider 106, a search engine 108, a website provider 110, and a plurality of Internet users 112. Generally, an advertiser 102 bids on terms and creates one or more advertisements by interacting with the advertisement campaign management system 104 in communication with the ad provider 106. The advertisement may be a banner advertisement that appears on a website viewed by Internet users 112, an advertisement that is served to an Internet user 108 in response to a search performed at a search engine such as a sponsored search listing, a video advertisement, or any other type of online or offline marketing media known in the art.

When an Internet user 112 performs a search at a search engine 108, or views a website served by the website provider 110, the advertisement service provider 106 serves one or more advertisements created using the advertisement campaign management system 104 to the Internet user 112 based on search terms or keywords provided by the internet user or obtained from a website. Additionally, the advertisement campaign management system 104 and advertisement service provider 106 typically record and process information associated with the served advertisement. For example, the advertisement campaign management system 104 and advertisement service provider 106 may record the search terms that caused the advertisement service provider 106 to serve the advertisement; whether the Internet user 112 clicked on a URL associated with the served advertisement; what additional advertisements the advertisement service provider 106 served with the advertisement; a rank or position of an advertisement when the Internet user 112 clicked on an advertisement; or whether an Internet user 112 clicked on a URL associated with a different advertisement. One example of an advertisement campaign management system the may perform these types of actions is disclosed in U.S. patent application Ser. No. 11/413,514, filed Apr. 28, 2006 and assigned to Yahoo! Inc. It will be appreciated that the disclosed systems and methods for determining semantically related terms based on sequences of search queries may operate in the environment of FIG. 1.

Figure 2:
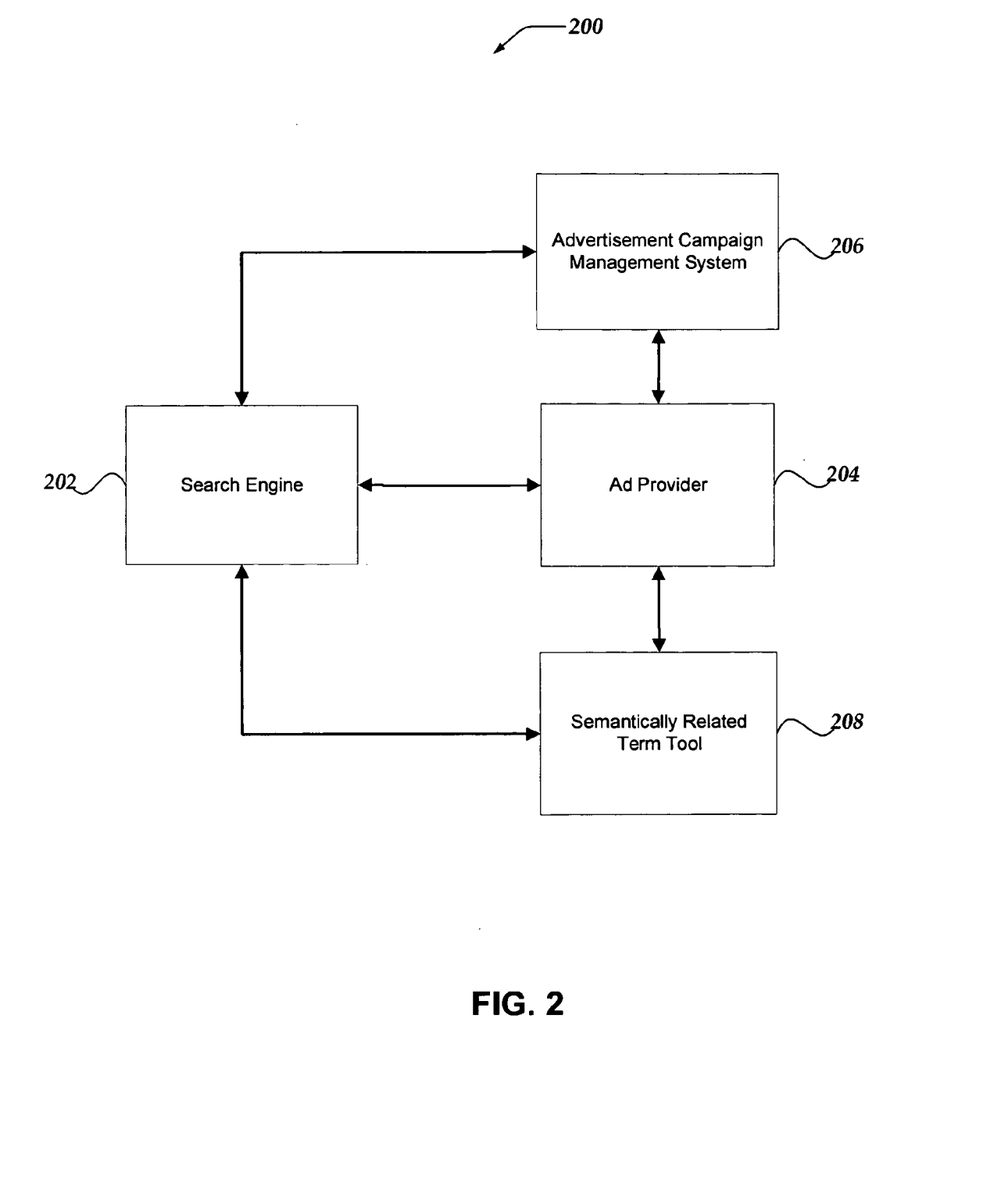
FIG. 2 is a block diagram of one embodiment of a system for determining semantically related terms based on sequences of search queries.

FIG. 2 is a block diagram of one embodiment of a system for determining semantically related terms based on sequences of search queries. The system 200 includes a search engine 202 and an online advertisement search provider ("ad provider") 204 that includes an advertisement campaign management system 206 and a semantically related term tool 208. The search engine 202, ad provider 204, ad campaign management system 206, and semantically related term tool 208 may communicate with each over one or more external or internal networks. Further, the search engine 202, ad provider 204, ad campaign management system 206, and semantically related term tool 208 may be implemented as software code running in conjunction with a processor such as a single server, a plurality of servers, or any other type of computing device known in the art.

Generally, the semantically related term tool 208 examines search query information from the search engine 202 and determines sequences of search queries by individual users that are related to a common concept. Search query information may include information about search queries received at the search engine 202, either for example stored in memory such as search logs or received and processed on a substantially real-time basis. After determining the sequences of search queries, the semantically related term tool 208 may receive seed terms and determine terms that are semantically related to the seed terms based on the sequences of search queries.

When a searcher submits a search query to the search engine 202, the search engine typically records in a search engine log at least the received search query and the search results served to the searcher in response to the received search query. A search engine log may include additional types of information such as the positioning of URLs in the search results, a URL the search clicked on after viewing the search results, the number of times the searcher clicked on the URL, the time the search query was received, the search query received before the present query, or any other type of information relating to the search query or search results desired by the search engine.

The semantically related term tool 208 examines search engine logs to determine sequences of search queries by an individual user that are related to a common concept. A searcher searching for a particular concept often tries many related search queries in the hope that one of the variations of the search query is better at returning documents that are more relevant to the particular concept being searched. To take advantage of this pattern, the semantically related term tool 208 examines the many related terms in search queries submitted for a particular concept to establish sequences of search queries that include related terms.

Often, when a searcher's research on a particular concept has ended, the searcher may submit a number of search queries related on a new second concept. However, sometimes a searcher may switch from a first concept, to a second concept, and then back to the first concept. Therefore, the semantically related term tool 208 examines all search queries for a particular period of time related to a user to determine if one or more search queries should be grouped into a sequence.

In one implementation, the semantically related term tool 208 examines the search logs according to the following pseudo-code:

```
Let allSequences = empty set
For each aUser from all users in search logs:
    Let allSequencesForUser = empty set
    For each search query Q for aUser:
        If Similarity(Q,aSequence) is less than a fixed threshold for any
            aSequence in allSequencesForUser:
            Add Q to aSequence
        Else:
            Insert Q into a new sequence aSequence
            Add aSequence to allSequencesForUser
    End for each search query
End for each user
```

Generally in accordance with this pseudo-code implementation, the semantically related term tool 206 executing the pseudo-code first sets the variable allSequences to an empty set. The process enters a first loop for each user in the search logs. Within the first loop, the variable allSequenceForUser is set to an empty set. Then, for each search query associated with the user, the process determines if the search query is similar to an established sequence based on a similarity threshold. The similarity threshold is a value that dictates the level of similarity required to place a search query in a sequence. A high similarity threshold results in the semantically related term tool 206 tightening the criteria to include a search query in a sequence and results in greater precision in similar search queries found in a sequence. However, the greater precision occurs at the cost of the semantically related term tool 206 finding less related search queries.

Continuing with the pseudo-code, if the search query is similar to one or more established sequence, the search query is added to at least one of the one or more established sequences that the search query is similar to. In one implementation, the search query is only added to the most recent established sequence that the search query is similar to. However, in other implementations, the search query may be added to more than one established sequence that the search query is similar to. If the search query is not similar to an established sequence, the search query is added to a new sequence and the new sequence is added to the variable allSequencesForUser. After it is determined whether each of the search queries associated with a user is similar to an established sequence, the second loop ends and the above-described process is repeated for each user in the search logs before exiting the first loop.

The semantically related term tool 206 determines whether a search query is similar to search queries of a sequence based on one or more properties of the search query and the search queries in the sequence. For example the semantically related term tool 206 may examine a minimum, average, or maximum edit distance between a search query and the search queries of a sequence; a minimum, average, or maximum edit distance between a search query and the search queries of a sequence; a minimum, average, or maximum difference between a time a search query was received at the search engine 202 and a time the search queries in the sequence were received at the search engine 202; the minimum, average, or maximum prefix overlap between a search query and the search queries of a sequence; the minimum, average, or maximum suffix overlap between a search query and the search queries of a sequence; whether a search query and the search queries of a sequence relate to the same geographic location; or whether a search query and the search queries of a sequence relate to a common product brand.

Generally, edit distance, also known as Levenshtein distance, is the smallest number of inserts, deletions, and substitutions of characters needed to change one search query into another search query and word edit distance is the smallest number of insertions, deletions, and substitutions of words needed to change one search query into another search query. Prefix overlap occurs between two search queries when one or more words occur at the beginning of both search queries. For example, the search queries "Chicago Bears" and "Chicago Cubs" have a prefix overlap due to the fact the word "Chicago" occurs at the beginning of the search queries. Similarly, suffix overlap occurs between two search queries when one or more words occur at the end of both search queries. For example, the search queries "San Francisco Giants" and "New York Giants" have a suffix overlap due to the fact the word "Giants" occurs at the end of the search queries.

In some implementations, after determining a plurality of search sequences, the semantically related term tool 206 may apply different weights to the search sequences based on the number of users who have submitted similar search sequences. For example, if multiple users submit the terms "basketball and "Lakers basketball" in a search sequence, the semantically related term tool 206 may have more confidence in that search sequence than when only one user has submitted the terms "basketball" and "Lakers basketball" in a search sequence.

The semantically related term tool 206 may apply supervised machine learning algorithms or function learning algorithms to known search queries relating to known concepts to enhance the ability of the semantically related term tool 2006 to accurately determine when a search query is related to a sequence. It will be appreciated that while the semantically related term tool 206 may apply supervised machine learning algorithms of function learning algorithms to any number of known search queries relating to common concepts, the more known related search queries relating to single concept, the more accurate the supervised machine learning algorithms and function learning algorithms will be in enhancing the ability of the semantically related term tool 2006 to accurately determine when a search query is related to a sequence.

The semantically related term tool 206 may train a model based on the results of the supervised machine learning algorithms and function learning algorithms so that when the semantically related term tool 206 examines future search logs, the semantically related term tool 206 may apply the model to determine whether a search query is similar to search queries of a sequence.

After establishing a plurality of sequences, the semantically related term tool 206 may examine the plurality of sequences to determine whether a program, rather than a person, submitted any portion of the search queries to the search engine 202. Search queries submitted by a program are often not helpful in establishing relationships between search queries. Therefore, the semantically related term tool 206 may remove any sequences of search queries created by a program.

In one implementation, the semantically related term tool 206 may determine if a program submitted any portion of the search queries based on the number of search queries submitted for a given period of time. For example, the semantically related term tool 206 may determine whether a program submitted any portion of the search queries based on properties of a search query such as a cookie received with the search query or an internet protocol address from which the search query was sent. Thus, the semantically related term tool 206 may determine that if more than a set quantity of search queries, such as 100 search queries, were submitted to a search engine 202 in less than five minutes with the same cookie, or from the same IP address which is not known for providing a high volume of traffic, a program is submitting the search queries and all sequences associated with the program should be removed.

In other implementations, the semantically related term tool 206 may determine whether a program has submitted any portion of the search queries based on lexical patterns of the search queries. For example, sequences of search queries with the words "link," "suggest," and "add" in conjunction with a domain name are indicative of lexical patterns that suggest a program submitted the search queries to the search engine 202.

In the following discussion, the word "term" is used in place of the word "search query." However, it should be understood that the word "term" in the following discussion may include one or more words or phrases received at a search engine 202, also known as a search query.

After establishing a plurality of sequences of search queries and removing any potential sequences of search queries created by a program, the semantically related term tool 206 may receive seed terms and determine a set of terms semantically related to seed terms based on the sequences of search queries. Each of the received seed terms may be a single word or a phrase. Further, each of the seed terms may be a positive seed term or a negative seed term. For example, a positive seed term may be a term that represents the type of terms that an advertiser would like to bid on to have the advertisement ad provider 204 serve an advertisement or the type of terms a searcher interacting with a search engine 202 would like to receive search results relating to. A negative seed term may be a term that represents the type of keyword an advertiser would not like to bid on to have the ad provider 204 serve an advertisement or the type of term a search interacting with a search engine 202 would not like to receive search results relating to. In other words, an advertiser, searcher, or system within the ad provider 204 such as the ad campaign management system 206 submits seed terms to receive more terms like a positive seed terms, while avoiding keywords like a negative seed term.

In one embodiment, the semantically related term tool 206 creates a first set of vectors associating for each sequence established above, whether each term in the search logs that is present in at least of the established sequences is present in the sequence. In one implementation, each entry in the first set of vectors will include a positive non-zero number if the term of the entry is associated with the relevant sequence and include the number zero if the term of the entry is not associated with the relevant sequence.

The semantically related term tool 206 additionally creates a second set of vectors. The semantically related term tool 206 may create the second set of vectors by weighing the entries of the first set of vectors based on one or more factors. For example, the semantically related term tool 206 may weigh the entries of the first set of vectors to create the second set of vectors based on the number of times a user submitted the term. In one implementation, the semantically related term tool 206 additionally weighs each entry of the first set of vectors by multiplying each entry of the first set of vectors by the logarithm of the quantity the total number of distinct sequences divided by the number of sequences associated with the term of the entry.

The semantically related term tool 206 may additionally normalize the second set of vectors so that the magnitude of each vector of the second set of vectors is one. Normalizing the second set of vectors adjusts the weight of each entry of the second set of vectors so that entries in the second set of vectors for sequences associated with multiple terms have less value than entries in the second set of vectors for sequences associated with fewer terms.

After receiving one or more seed terms, the semantically related term tool 206 creates a seed term vector based on the received seed terms. As discussed above, each of the seed terms may be a single word or a phrase. Additionally, each seed term may be a positive seed term or a negative seed term. In one implementation, the seed term vector comprises a value for each term in the search logs, where the value of the entry is a positive non-zero number if the term is a positive seed term, the value of the entry a negative non-zero number if the term is a negative seed term, and the value of the entry is zero if the term is not a seed term.

The semantically related term tool 206 may logarithmically weigh each entry of the seed term vector based on how may sequences each seed term is associated with as described above. The semantically related term tool 206 may additionally normalize the seed term vector so that the magnitude of the seed term vector is one.

The semantically related term tool 206 calculates a weighted average over a number of sequences to determine a plurality of potential terms semantically related to the seed terms. In one embodiment, the semantically related term tool 206 calculates the weighted average over all sequences established above. However, in other embodiments, the semantically related term tool 206 calculates the weighted average over a number of sequences that is less than the total number of sequences. For example, the semantically related term tool 206 may determine a number of sequences, such as 1,000 sequences, that are closest to the seed terms based on the entries in the second set of vectors. The semantically related term tool 206 then calculates the weighted average of the predetermined number of sequences that the semantically related term tool 206 determined are closest to the seed terms.

Specifically, the advertisement campaign management system calculates a weighted average as a function of the first and second set of vectors and the seed term vector. In one embodiment, the weighted average is calculated using the function:

$$T=\text{Sum of } (V1^*\text{VectorSimilarity}(V2,S)),$$

wherein V1*VectorSimilarity(V2,S) is calculated for a number of sequences found in the search logs; V1 is the relevant vector of the first set of vectors indicating for each term in the search logs, whether a term is associated with the relevant sequence; V2 is the relevant vector of the second set of vectors including for each term in the search logs, an entry indicating a weight of a term associated with the sequence; and S is the seed term vector indicating for each term in the search logs, whether the term is one of the seed terms received by a user.

In one implementation, the weighted average is calculated using the equation sum of (V1*cosine(V2,S)), but in other implementations, the vector similarities are calculated based on a Pearson correlation, cosine similarity, mutual information, Jaccard's coefficients, Tanimoto coefficients, or similarity metrics based on distance metrics like Euclidean distance, Hamming distance, Chebychev's distance, Mahalonobis distance, or Manhattan distance.

As discussed above, the semantically related term tool 206 may calculate the sum of (V1*VectorSimilarity(V2,S)) for all sequences. However, in other implementations, the semantically related term tool 206 may calculate V1*VectorSimilarity(V2,S) for all sequences but only sum the result V1*VectorSimilarity(V2,S) for a limited number of sequences to create the vector T. In this implementation, the semantically related term tool 206 examines the result of V1*VectorSimilarity(V2,S) for all sequences to determine a number of sequences that are closest to the seed term vector based on vector similarities. The advertisement campaign management system then sums the result of V1*VectorSimilarity(V2,S) for the sequences that the semantically related term tool 206 determines are closest to the seed term vector based on vector similarties to create the vector T. In one embodiment, the semantically related term tool 206 may sum the result of V1*VectorSimilarity(V2,S) for the top 1,000 sequences that are closest to the seed term vector based on vector similarities to create the vector T, but the semantically related term tool 206 may sum the result of V1*VectorSimilarity(V2,S) over any number of sequences to create the vector T.

After calculating the sum of (V1*VectorSimilarity(V2,S)), T will comprise a vector having a value for each term in the search logs. The semantically related term tool 206 examines the resulting vector T to determine the terms having the highest corresponding entries after the weighted average. In one embodiment, the semantically related term tool 206 may determine the top ten terms having the highest value in the resulting vector T after the weighted average, but the semantically related term tool 206 may determine any number of top terms.

In one implementation, the semantically related term may be exported to a system of the ad provider 204 such as the ad campaign management system 208 for use in a keyword suggestion tool. In other implementations, the semantically related terms may be exported to the search engine 202 to broaden or focus searches.

Figure 3:
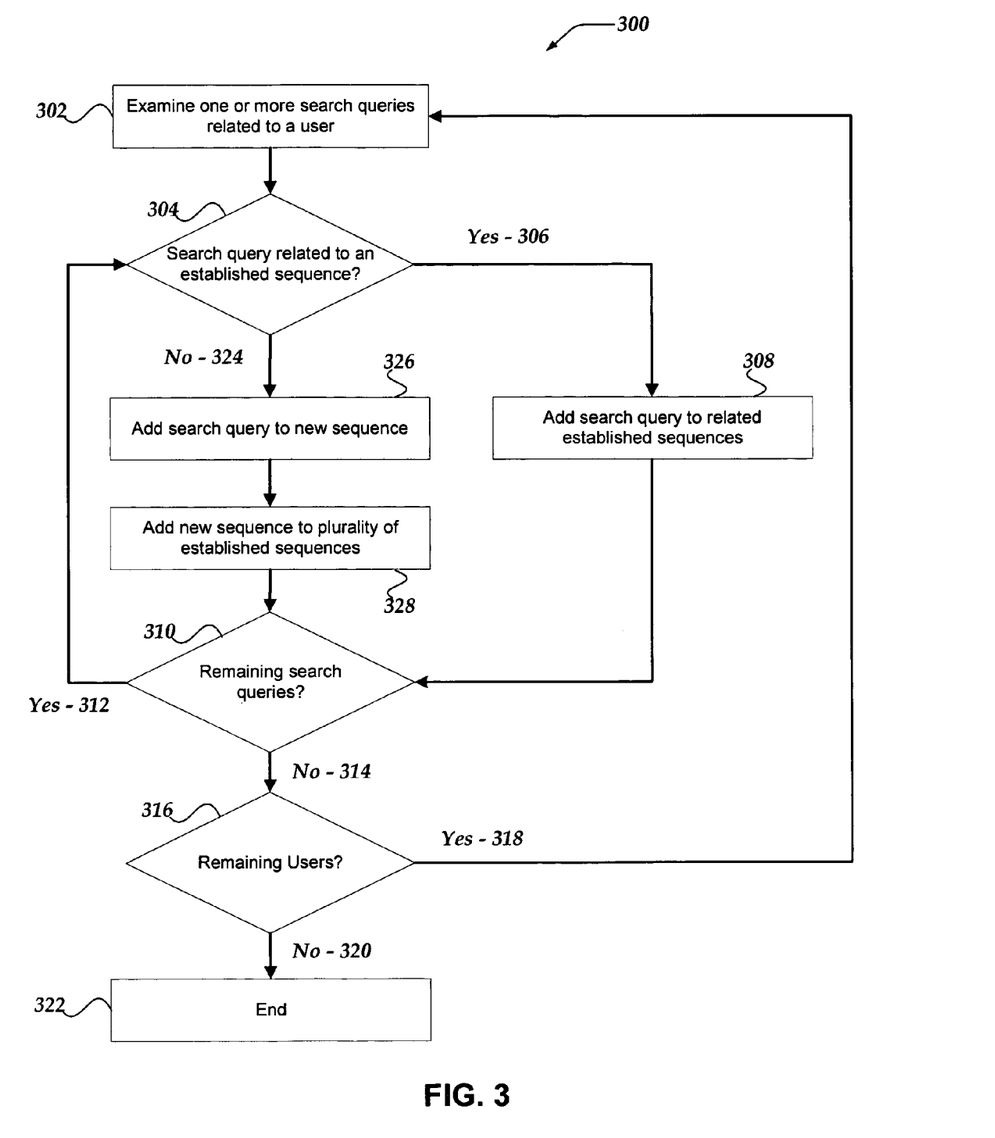
FIG. 3 is a flow chart of one embodiment of a method for establishing a plurality of sequences of search queries.

FIG. 3 is a flow chart of one embodiment of a method for establishing a plurality of search queries. The method 300 begins with a semantically related term tool examining one or more search queries related to a user at step 302. For a single user, the semantically related term tool determines whether a search query is related to at least one established sequence based on a similarity threshold at step 304. As discussed above, the semantically related term tool may calculate similarity based on factors such as a minimum, average, or maximum edit distance between a search query and the search queries of a sequence; a minimum, average, or maximum edit distance between a search query and the search queries of a sequence; a minimum, average, or maximum difference between a time a search query was received at the search engine and a time the search queries in the sequence were received at the search engine; the minimum, average, or maximum prefix overlap between a search query and the search queries of a sequence; and the minimum, average, or maximum suffix overlap between a search query and the search queries of a sequence. If the search query is related to at least one established sequence such that the similarity threshold is exceeded (306), the semantically related term tool adds the search query to one or more of the established sequences that the search query is determined to be similar to at step 308.

The method then proceeds to step 310 where the semantically related term tool determines whether there are any remaining search queries associated with the user to be examined. If there are remaining search queries to be examined (312), the method loops to step 304. However, if there are no remaining search queries to be examined associated with the user (314), the method loops to step 316.

At step 316, the semantically related term tool determines whether there are any remaining users with search queries that need to be examined. If there are remaining users with search queries that need to be examined (318), the method loops to step 302 and the method proceeds as described above. However, if there are no remaining users with search queries that need to be examined (320), the method ends at step 322.

If at step 304, the search query is not related to at least one established sequence (324), the semantically related term tool adds the search query to a new sequence at step 326. The new sequence is then added to the one or more established sequences at step 328 and the method proceeds to step 310 where the method proceeds as discussed above until the method ends at step 322.

It will be appreciated that after completing the method 300 of FIG. 3, the semantically related term tool will have created a plurality of sequences of search queries. Using the plurality of sequences of search queries, the semantically related term tool may accept seed terms and determine one or more terms semantically related to the received seed terms.

Figure 4:
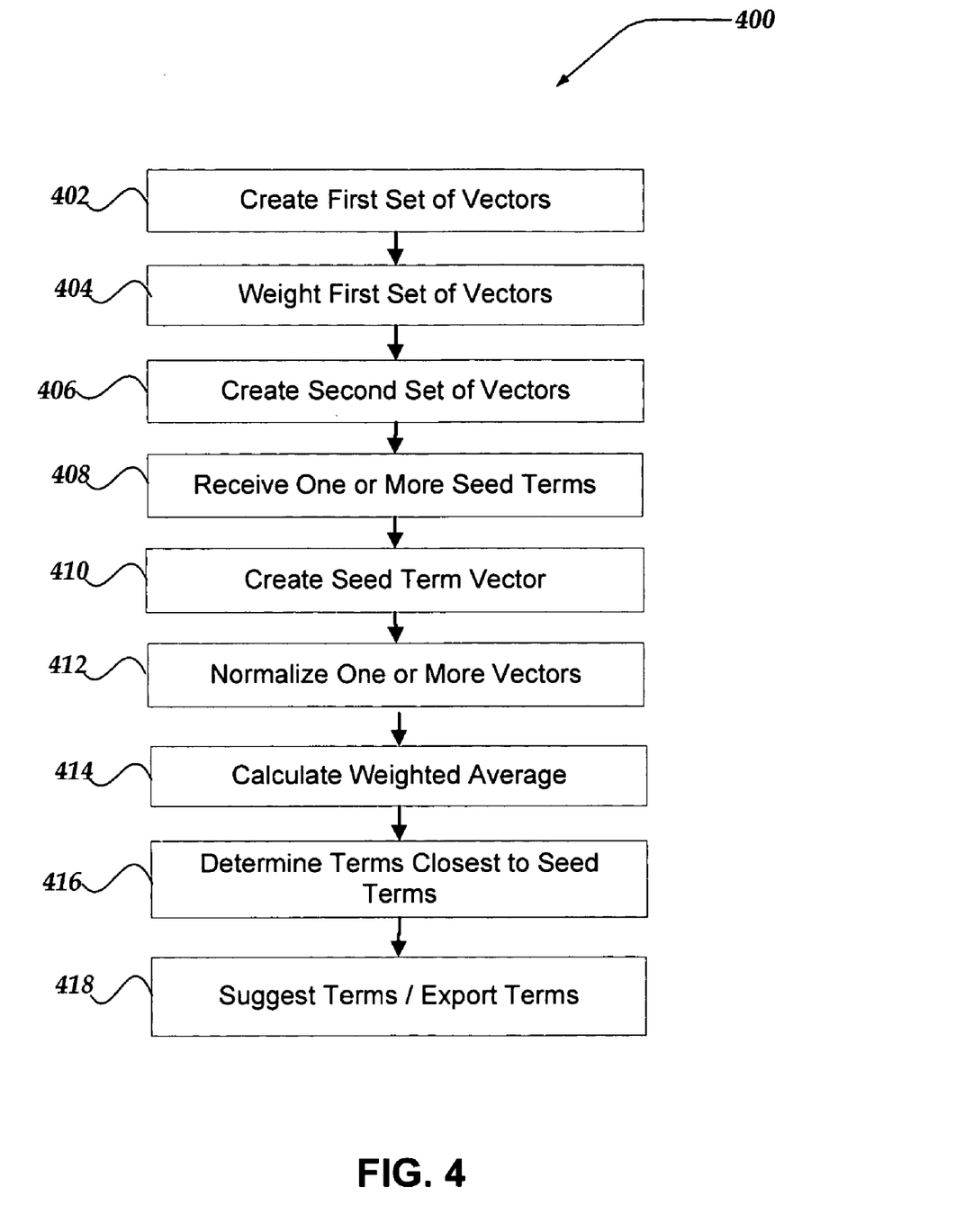
FIG. 4 is a flow chart of one embodiment of a method for determining semantically related terms based on sequences of search queries.

FIG. 4 is a flow chart of one embodiment of a method for determining semantically related terms based on sequences of search queries. The method 400 begins with the semantically related term tool creating a first set of vectors at step 402. As discussed above, the first set of vectors associate for each sequence established in the method of FIG. 3, whether each term in the search logs is present in the sequence. In one implementation, each entry in the first set of vectors will include a positive non-zero number if the term of the entry is associated with the relevant sequence and include the number zero if the term of the entry is not associated with the relevant sequence.

In some implementations, the semantically related term tool may weight each entry of the first set of vectors at step 404. For example, the semantically related term tool may weigh each entry of the first set of vectors by multiplying each entry of the first set of vectors by the logarithm of the quantity the total number of distinct sequences determined in the method of FIG. 3 divided by the number of sequences associated with the term of the entry.

The semantically related term tool then creates a second set of vectors at step 406. As described above, the semantically related term tool may create the second set of vectors by weighing the entries of the first set of vectors based on one or more factors such as a number of times a user submitted the term.

The semantically related term tool receives a set of seed terms at step 408. The semantically related term tool may receive the seed terms from an advertiser interacting with an advertisement campaign management system of an ad provider, from a searcher interacting with a search engine, or from other systems within an ad provider such as an ad campaign optimizer. As explained above, each of the seed terms may be a single word or a phrase, and each seed term may be a positive seed term or a negative seed term. The semantically related term tool creates a seed term vector based on the received seed terms at step 410. In one implementation, the seed term vector comprises a value for each term in the search logs, where the value of the entry is a positive non-zero number if the term is a positive seed term, the value of the entry a negative non-zero number if the term is a negative seed term, and the value of the entry is zero if the term is not a seed term.

The semantically related term tool may normalize one or more of the first set of vectors, second set of vectors, and seed term vector at step 412. After normalizing one or more of the vectors, the semantically related term tool calculates a weighted average over a number of sequences at step 414. As discussed above, the semantically related term tool may calculate the weighted average over all sequences established in the method of FIG. 3, or the semantically related term tool may calculate the weighted average over a number of sequences that is less than the total number of sequences established in the method of FIG. 3.

After calculating the weighted average over a number of sequences at step 414, the semantically related term tool examines the resulting vector at step 416 to determine terms having the highest corresponding entries after the weighted average. Depending on what system the semantically related term tool received the seed terms from, at step 418, the semantically related term tool may perform actions such as suggest one or more semantically related terms to a user interacting with a keyword suggestion tool of an ad provider, the semantically related term tool may export one or more semantically related terms to a searcher interacting with a search engine, or the semantically related term tool may export one or more semantically related terms to a system of an ad provider such as an advertisement campaign management system.

FIGS. 1-4 disclose systems and methods for predicting semantically related terms based on sequences of search queries. It should be appreciated that the above methods and systems may be implemented for uses such as discovering semantically related words for purposes of bidding on online advertisements, to assist a searcher performing research at an Internet search engine, and to automatically discover terms related to evolving products of a given product brand or related to new events happening at a given place of interest. With respect to assisting a search performing research at an Internet search engine, a searcher may send one or more terms to a search engine. The search engine may use the terms as seed terms and suggest semantically related words related to the terms either with the search results generated in response to the terms, or independent of any search results. Providing the searcher with semantically related terms allows the searcher to broaden or focus any future searches so that the search engine provides more relevant search results to the searcher.

With respect to automatically discovering terms related to evolving products of a given product brand, a semantically related term tool may receive a term such as Sony DVD player. Following the procedure described above, the semantically related term tool may return a term such as Sony <new model> DVD player relating to a new model of Sony DVD players based on sequences of search queries containing both the term Sony DVD player and Sony <new model> DVD player. Similarly, with respect to automatically discovering terms related to new events happening at a given place of interest, a semantically related term tool may receive a term such as Burbank. Following the procedure described above, the semantically related term tool may return a term such as Yahoo! Burbank based on sequences of search queries containing both the term Burbank and Yahoo! Burbank.

Further, it should be appreciated that an online advertisement service provider may use the disclosed methods and systems in a campaign optimizer component to determine semantically related terms to match advertisements to terms received from a search engine or terms extracted from the content of a webpage or news articles, also known as content match. Using semantically related terms allows an online advertisement service provider to serve an advertisement if the term that an advertiser bids on is semantically related to a term sent to a search engine rather than only serving an advertisement when a term sent to a search engine exactly matches a term that an advertiser has bid on. Providing the ability to serve an advertisement based on semantically related terms when authorized by an advertiser provides increased relevance and efficiency to an advertiser so that an advertiser does not have to determine every possible word combination where the advertiser would like their advertisement served to a potential customer.

It is therefore intended that the foregoing detailed description be regarded as illustrative rather than limiting, and that it be understood that it is the following claims, including all equivalents, that are intended to define the spirit and scope of this invention.

The invention claimed is:

1. A method for determining one or more semantically related terms based on sequences of search queries, the method comprising:
   examining search query information to associate search queries with a user submitting the search query;
   establishing a plurality of sequences of search queries, each sequence of search queries comprising one or more search queries associated with a common user and relating to a common concept;
   receiving one or more seed terms;
   creating a first set of vectors representing for each search query in the search query information, whether the search query is associated with each sequence of the plurality of sequences;
   creating a second set of vectors representing for each search query in the search query information, a weight associated with the search query based on the number of sequences of the plurality of sequences the search query is associated with; and determining one or more terms semantically related to the seed terms based on the first set of vectors, the second set of vectors, and at least one seed term of the received one or more seed terms;

wherein determining one or more terms semantically related to the seed terms comprises determining a weighted average over each sequence of the plurality of sequences as a function of the first and second set of vectors, and the at least one seed term; and wherein the weighted average is calculated using the formula:

$$T=\text{Sum of }(V1*\text{VectorSimilarity}(V2,S)),$$

wherein V1*VectorSimilarity (V2,S) is calculated for a number of sequences found in the search query information; V1 is the relevant vector of the first set of vectors indicating for each search query in the search query information, whether a search query is associated with the relevant sequence; V2 is the relevant vector of the second set of vectors including for each search query in the search query information, an entry indicating a weight of a search query associated with the sequence; and S is the seed term vector indicating for each search query in the search query information, whether the search query is one of the received seed terms.

2. The method of claim 1, wherein establishing a plurality of sequences of search queries comprises:
  adding a first search query associated with a first user to a first sequence;
  determining whether to add a second search query associated with the first user to the first sequence based on a similarity between the second search query and at least the first search query of the first sequence;
  adding the second search query to the first sequence in response to determining the similarity between the second search query and at least the first search query of the first sequence exceeds a similarity threshold; and
  adding the second query to a second sequence in response to determining the similarity between the second search query and at least the first search query of the first sequence does not exceed the similarity threshold.

3. The method of claim 2, wherein determining a similarity between the second search query and at least the first search query of the first sequence is based on at least one of:
  an edit distance between the second search query and at least the first search query of the first sequence;
  a word edit distance between the second search query and at least the first search query of the first sequence;
  a difference between a time the second search query issued and the time that at least the first search query of the first sequence issued;
  whether there is a prefix overlap between the second search query and at least the first search query of the first sequence;
  whether there is a suffix overlap between the second search query and at least the first search query of the first sequence;
  a geographic location related to the second search query and at least the first search query of the first sequence; and
  a product brand associated with the second search query and at least the first search query of the first sequence.

4. The method of claim 1, wherein determining one or more terms semantically related to the seed terms comprises:
  weighing each entry in first and second set of vectors based on a total number of sequences of the plurality of sequences and a number of sequences that contain each search query; and
  normalizing the first and second set of vectors.

5. The method of claim 1, wherein the VectorSimilarity operation is one of a Pearson correlation, a cosine similarity, mutual information, Jaccard's coefficient, Tanimoto coefficients, or similarity metrics based on distance metrics like Euclidean distance, Hamming distance, Chebychev's distance, Mahalonobis distance, and Manhattan distance.

6. A computer-readable storage medium comprising a set of instructions for determining one or more semantically related terms based on sequences of search queries, the set of instructions to direct a processor to perform acts of:
  examining search query information to associate search queries with a user submitting the search query;
  establishing a plurality of sequences of search queries, each sequence of search queries comprising one or more search queries associated with a common user and relating to a common concept;
  receiving one or more seed terms;
  creating a first set of vectors representing for each search query in the search query information, whether the search query is associated with each sequence of the plurality of sequences;
  creating a second set of vectors representing for each search query in the search query information, a weight associated with the search query based on the number of sequences of the plurality of sequences the search query is associated with; and
  determining one or more terms semantically related to the seed terms based on the first set of vectors, the second set of vectors, and at least one seed term of the received one or more seed terms;
  wherein determining one or more terms semantically related to the seed terms comprises determining a weighted average over each sequence of the plurality of sequences as a function of the first and second set of vectors, and the at least one seed term; and
  wherein the weighted average is calculated using the formula:

$$T=\text{Sum of }(V1*\text{VectorSimilarity}(V2,S)),$$

wherein V1*VectorSimilarity (V2,S) is calculated for a number of sequences found in the search query information; V1 is the relevant vector of the first set of vectors indicating for each search query in the search query information, whether a search query is associated with the relevant sequence; V2 is the relevant vector of the second set of vectors including for each search query in the search query information, an entry indicating a weight of a search query associated with the sequence; and S is the seed term vector indicating for each search query in the search query information, whether the search query is one of the received seed terms.

7. The computer-readable storage medium of claim 6, wherein establishing a plurality of sequences of search terms comprises:
  adding a first search query associated with a first user to a first sequence;
  determining whether to add a second search query associated with the first user to the first sequence based on a similarity between the second search query and at least the first search query of the first sequence;
  adding the second search query to the first sequence in response to determining the similarity between the second search query and at least the first search query of the first sequence exceeds a similarity threshold; and adding the second query to a second sequence in response to determining the similarity between the second search query and at least the first search query of the first sequence does not exceed the similarity threshold.

8. A system for determining one or more semantically related terms based on sequences of search queries, the system comprising:

a search query memory module storing search query information, the search query information associating at least search queries received at a search engine and a user submitting the search queries, a semantically related term tool operative to:

access the search query memory module storing search query information and determine a plurality of search sequences, each search sequence comprising one or more search queries submitted by a common user and related to a common concept;

create a first set of vectors representing for each search query in the search query information of the search query memory module, whether the search query is associated with each sequence of the plurality of sequences;

create a second set of vectors representing for each search query in the search query information of the search query memory module, a weight associated with the search query based on the number of sequences of the plurality of sequences the search query is associated with; and determine one or more terms semantically related to the seed terms based on the first set of vectors, the second set of vectors, and at least one seed term of the received one or more seed terms;

wherein to determine one or more terms semantically related to the seed terms, the semantically related term tool is further operative to determine a weighted average over each sequence of the plurality of sequences as a function of the first and second set of vectors, and the at least one seed term; and wherein the weighted average is calculated using the formula:

$$T = \text{Sum of } (V1 * \text{VectorSimilarity}(V2,S)),$$

wherein V1*VectorSimilarity (V2,S) is calculated for a number of sequences found in the search query information; V1 is the relevant vector of the first set of vectors indicating for each search query in the search query information, whether a search query is associated with the relevant sequence; V2 is the relevant vector of the second set of vectors including for each search query in the search query information, an entry indicating a weight of a search query associated with the sequence; and S is the seed term vector indicating for each search query in the search query information, whether the search query is one of the received seed terms.

9. The system of claim 8, wherein the semantically related term tool receives the one or more seed terms from a system of an online advertisement service provider.

10. The system of claim 9, wherein the one or more seed terms are received from a keyword suggestion tool of the online advertisement service provider.

11. The system of claim 9, wherein the one or more seed terms are received from an advertisement campaign management system of the online advertisement service provider.

12. The system of claim 8, wherein the semantically related term tool comprises:

a memory module operative to store a set of instructions for directing a processor to access the search query memory module storing search query information and determine a plurality of search sequences, each search sequence comprising one or more search queries submitted by a common user and related to a common concept, to receive one or more seed terms, and to determine one or more terms semantically related to the received seed terms based on the determined plurality of sequences of search queries; and a processor operative to access the memory module of the semantically related term tool and execute the set of instructions.

13. The system of claim 8, wherein the semantically related term tool is operative to determine a plurality of sequences based on similarities between a first search query and at least one search query of a sequence of the plurality of sequences.

14. The system of claim 13, wherein similarities between search queries is based on at least one of:

an edit distance between the second search query and at least the first search query of the first sequence;

a word edit distance between the second search query and at least the first search query of the first sequence;

a difference between a time the second search query issued and the time that at least the first search query of the first sequence issued;

whether there is a prefix overlap between the second search query and at least the first search query of the first sequence;

whether there is a suffix overlap between the second search query and at least the first search query of the first sequence;

a geographic location related to the second search query and at least the first search query of the first sequence; and a product brand associated with the second search query and at least the first search query of the first sequence.

* * * * *